(12) United States Patent
Passno

(10) Patent No.: US 6,379,023 B1
(45) Date of Patent: Apr. 30, 2002

(54) LIGHT ASSEMBLY FOR AN ELECTRICALLY INSULATED LIFT BUCKET

(76) Inventor: Edward Passno, 202 Recreation Dr., Effort, PA (US) 18330

(*) Notice: Subject to any disclaimer, the term of this patent is extended or adjusted under 35 U.S.C. 154(b) by 0 days.

(21) Appl. No.: 09/387,531

(22) Filed: Aug. 31, 1999

(51) Int. Cl.[7] .............................. F21V 33/00; B60Q 3/00
(52) U.S. Cl. ........................ 362/253; 362/485; 362/486; 362/431; 362/192
(58) Field of Search .................................. 362/468, 485, 362/457, 458, 493, 385, 386, 233, 253, 396, 192, 270, 285, 431, 450, 287, 523, 529, 530, 531, 532, 418, 427, 419; 315/76, 77, 78, 79, 80, 82

(56) References Cited

U.S. PATENT DOCUMENTS

| | | |
|---|---|---|
| 2,643,515 A | 6/1953 | Harsch |
| 3,264,671 A | 8/1966 | Carpenter |
| 3,554,317 A | 1/1971 | Birbanescu et al. |
| 4,169,511 A | 10/1979 | Brown |
| 5,064,013 A | 11/1991 | Lenz |
| 5,207,747 A * | 5/1993 | Gordin et al. ............... 362/233 |
| 5,267,129 A * | 11/1993 | Anderson ..................... 362/96 |
| 5,428,958 A | 7/1995 | Stenlund |
| 5,659,205 A * | 8/1997 | Weisser ........................ 290/52 |
| 5,959,416 A * | 9/1999 | Clutter et al. ............... 318/141 |
| 5,977,648 A * | 11/1999 | Seffernick et al. ............ 290/43 |
| 6,023,134 A * | 2/2000 | Carl et al. ................... 318/140 |
| 6,092,911 A * | 7/2000 | Baker, III et al. ........... 362/253 |

* cited by examiner

Primary Examiner—Thomas M. Sember
Assistant Examiner—David V. Hobden
(74) Attorney, Agent, or Firm—Akin, Gump, Strauss, Hauer & Feld, L.L.P.

(57) ABSTRACT

A light assembly is adapted for use with an electrically insulated bucket disposed on the boom of an aerial lift truck having a pressurized hydraulic fluid supply positioned proximate to the bucket. The light assembly includes a power supply which converts energy from a fluid flow from the pressurized hydraulic fluid supply to electrical energy and a lamp that is electrically connected to the power supply and receives electrical energy therefrom.

10 Claims, 5 Drawing Sheets

LIGHT ASSEMBLY FOR AN ELECTRICALLY INSULATED LIFT BUCKET

BACKGROUND OF THE INVENTION

The present invention is directed to a light assembly and, more specifically, to a light assembly adapted for use with an electrically insulated bucket. Almost all aerial lift trucks use buckets that are electrically insulated from the rest of the truck. This helps prevent workers from being shocked while working on electrical systems and power lines. Typically, the bucket is mounted on the end of a boom which cannot have any electrical wires running along the boom to the bucket because such electrical wires would prevent the bucket from being insulated from the rest of the truck.

The need to maintain the electrical isolation of the bucket presents difficulties in lighting the area to be serviced by a worker especially in an elevated low light environment. Presently, elevated areas are illuminated using work lights or flood lights that are positioned on the ground and powered by a generator or other power source that is also on the ground. Unfortunately, while working in an elevated area, the use of such ground-based lights creates large shadows and blind spots for the worker due to the bucket and the worker's body. Additionally, it is generally not possible for a worker who is in the elevated bucket to adjust the ground-based lights. Thus, adjusting the lights requires either that extra workers be available to adjust the lights as needed or that the worker lower the bucket to adjust the lights and then reposition the bucket to continue work.

As an alternative, battery powered lights have been used to light elevated areas. Unfortunately, using battery powered lights requires repeated charging of the batteries and the battery powered lights only provide light for a limited amount of time.

The present invention overcomes the above mentioned problems by providing a light assembly for use in an aerial work space that substantially eliminates the generation of shadows due to the worker and the bucket. The present invention substantially eliminates blind spots and is easy for a worker to position and to adjust without having to reposition the bucket. Furthermore, the present invention does not require charging prior to use, and does not have a limited light producing time.

SUMMARY OF THE INVENTION

Briefly stated, the present invention is directed to a light assembly adapted for use with an electrically insulated bucket disposed on a boom of an aerial lift truck having a pressurized hydraulic fluid supply positioned proximate to the bucket. The light assembly includes a power supply which converts energy from a fluid flow from the pressurized hydraulic fluid supply to electrical energy and a lamp that is electrically connected to the power supply and receives electrical energy therefrom.

BRIEF DESCRIPTION OF THE DRAWINGS

The foregoing summary, as well as the following detailed description of the preferred embodiment of the invention, will be better understood when read in conjunction with the appended drawings. For the purpose of illustrating the invention, there is shown in the drawings an embodiment which is presently preferred. It is understood, however, that the invention is not limited to the precise arrangement and instrumentality shown. In the drawings.

DETAILED DESCRIPTION OF THE INVENTION

Figure 1:
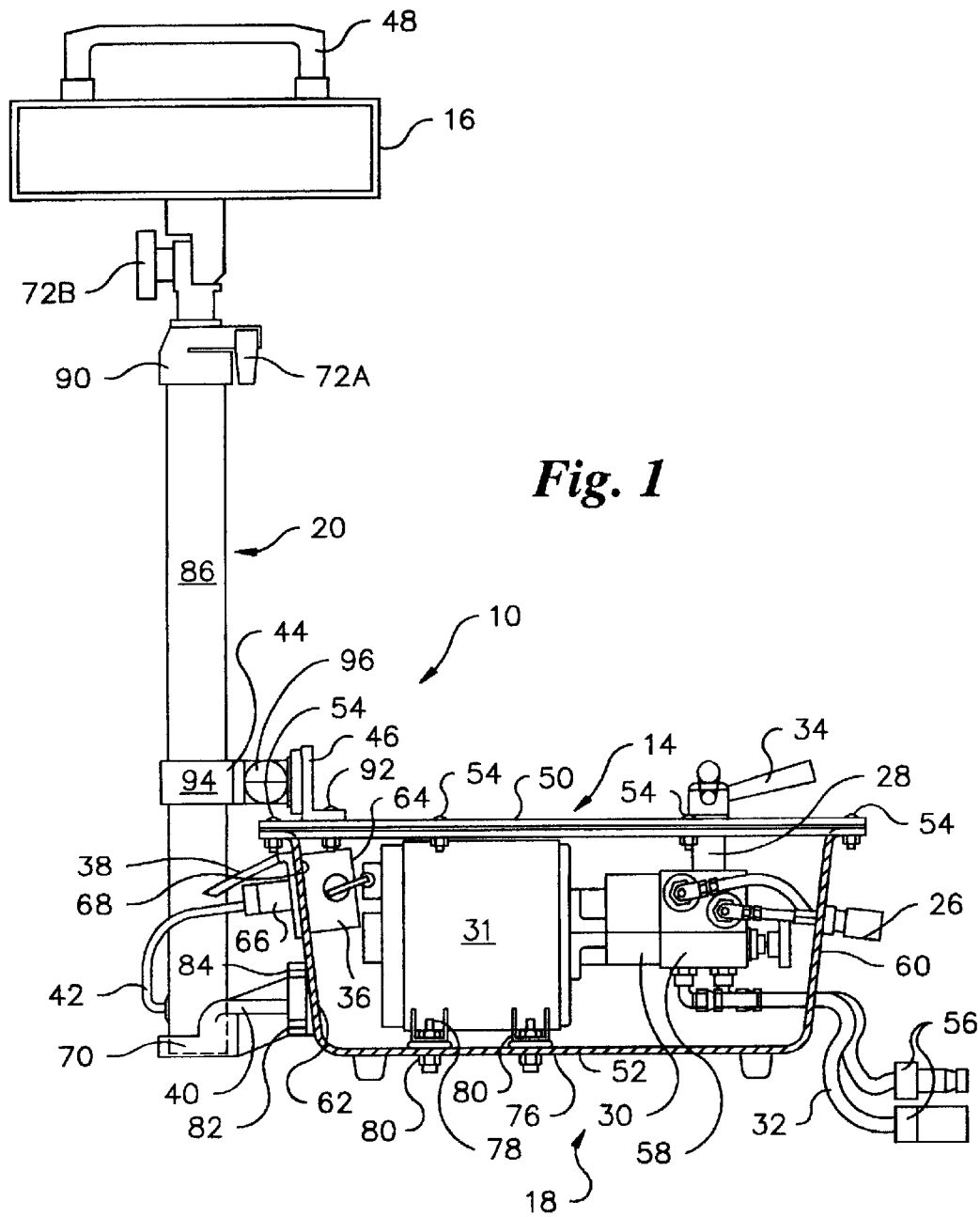
FIG. 1 is a side elevational view, partially in cross-section, of the light assembly according to the present invention.

Certain terminology is used in the following description for convenience only and is not limiting. The words "right," "left," "lower," and "upper" designate directions in the drawings to which reference is made. The words "inwardly" and "outwardly" refer to directions toward and away from, respectively, the geometric center of the light assembly and designated parts thereof The terminology includes the words above specifically mentioned, derivatives thereof, and words of similar import. Additionally, the word "a," as used in the specification and the claims, means "at least one."

Referring to the drawings in detail, wherein like numerals indicate like elements throughout, there is shown in FIGS. 1–5 a preferred embodiment of a light assembly, designated 10. Generally, the light assembly 10 is adapted for use with an electrically insulated bucket 12 that is disposed on a boom of an aerial lift truck having a pressurized hydraulic fluid supply 98 positioned proximate to the bucket 12. Such a pressurized hydraulic fluid supply usually includes a supply and return connection to allow a worker 'W' to connect a hydraulically powered tool. The light assembly 10 allows the worker 'W' to project light onto a work area (not shown) with a minimum amount of shadow generation resulting from the relative placement of the light assembly 10, the bucket 12, the worker 'W', and the work area needing illumination.

Figure 4:
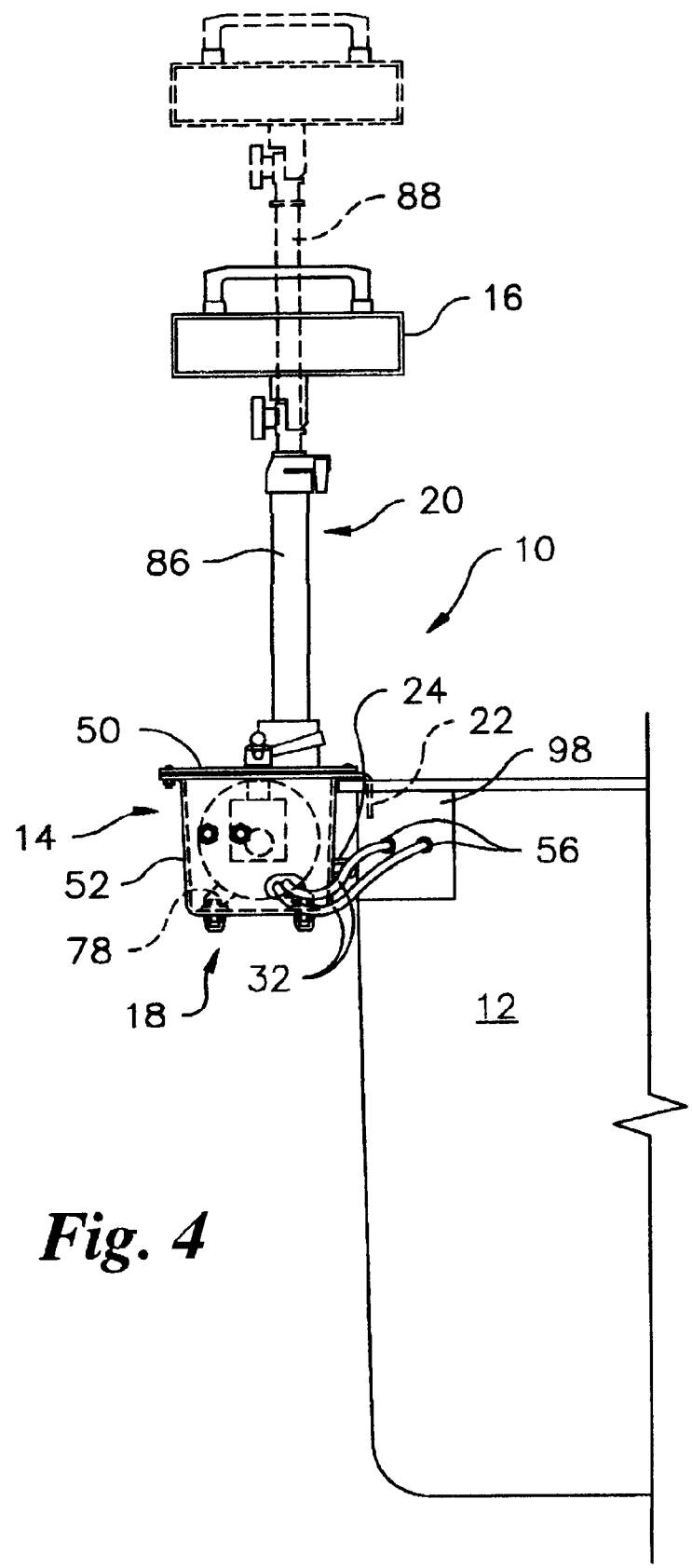
FIG. 4 is a front elevational view, partially in cross-section, of the light assembly of FIG. 1 attached to a bucket showing the adjustability of the position of the lamp.

The light assembly 10 includes a power supply 14 which converts energy from a fluid flow from the pressurized hydraulic fluid supply to electrical energy. A lamp 16 is electrically connected to the power supply 14 and the electrical energy is used to power the lamp 16. The power supply 14 preferably includes a hydraulic turbine 30 that is attached to an electric generator 31. Preferably the turbine can operate on a flow of 3–5 gallons per minute to turn the generator 31. The generator preferably has an output of about 300-watts. However other suitable turbine and generator sizes could be utilized, if desired. A plurality of non-conductive hoses 32 are connected to the hydraulic turbine 30, with one supplying pressurized hydraulic fluid to turn the turbine 30 and the other providing a return line for recirculating the fluid. The non-conductive hoses 32 are adapted to engage the pressurized hydraulic fluid supply 98 that is positioned proximate to the bucket 12. Couplings 56 are used to engage the non-conductive hoses 32 with the pressurized hydraulic fluid supply 98 connection located on the bucket 12, as shown in FIG. 4. The selection of the type of couplings 56 for use with the light assembly 10 is generally known to those of skill in the art when taken in combination with this disclosure and is not pertinent to the present invention. Accordingly, specifics regarding the couplings 56 are not further detailed herein.

While it is preferable that the pressurized hydraulic fluid supply 98 be on the bucket 12, those of skill in the art will appreciate from this disclosure that the present invention is not limited to a light assembly for use with a bucket bearing a pressurized hydraulic fluid supply 98. For instance, the pressurized hydraulic fluid supply 98 could be located on the end of the boom supporting the bucket 12. The only important aspect of the positioning of the pressurized hydraulic fluid supply 98 is that the non-conductive hoses 32 of the light assembly 10 be able to engage the pressurized hydraulic fluid supply 98.

A housing 18 substantially encloses the power supply 14. The housing 18 is formed by a base enclosure 52 and a removable cover 50 which is secured to the base enclosure 52 via fasteners 54. The fasteners 54 are preferably conventional fasteners, such as bolt and nut pairs.

The base enclosure 52 has a rectangular bottom surface 76 and four sides extending upward to form a rectangularly shaped container. While the preferred embodiment of the base enclosure 52 has a rectangular bucket-like shape, those of ordinary skill in the art will appreciate from this disclosure that the present invention is not limited to a base enclosure 52 having any particular shape. The cover 50 is preferably a rectangularly shaped plate that is mounted onto the top of the base enclosure 52 to substantially enclose the power supply 14. While the preferred cover 50 has a rectangular shape, those of skill in the art will understand through this disclosure that the cover 50 can have any shape as long as it is mountable onto the base enclosure 50 and substantially covers the open top of the base enclosure 52.

Figure 2:
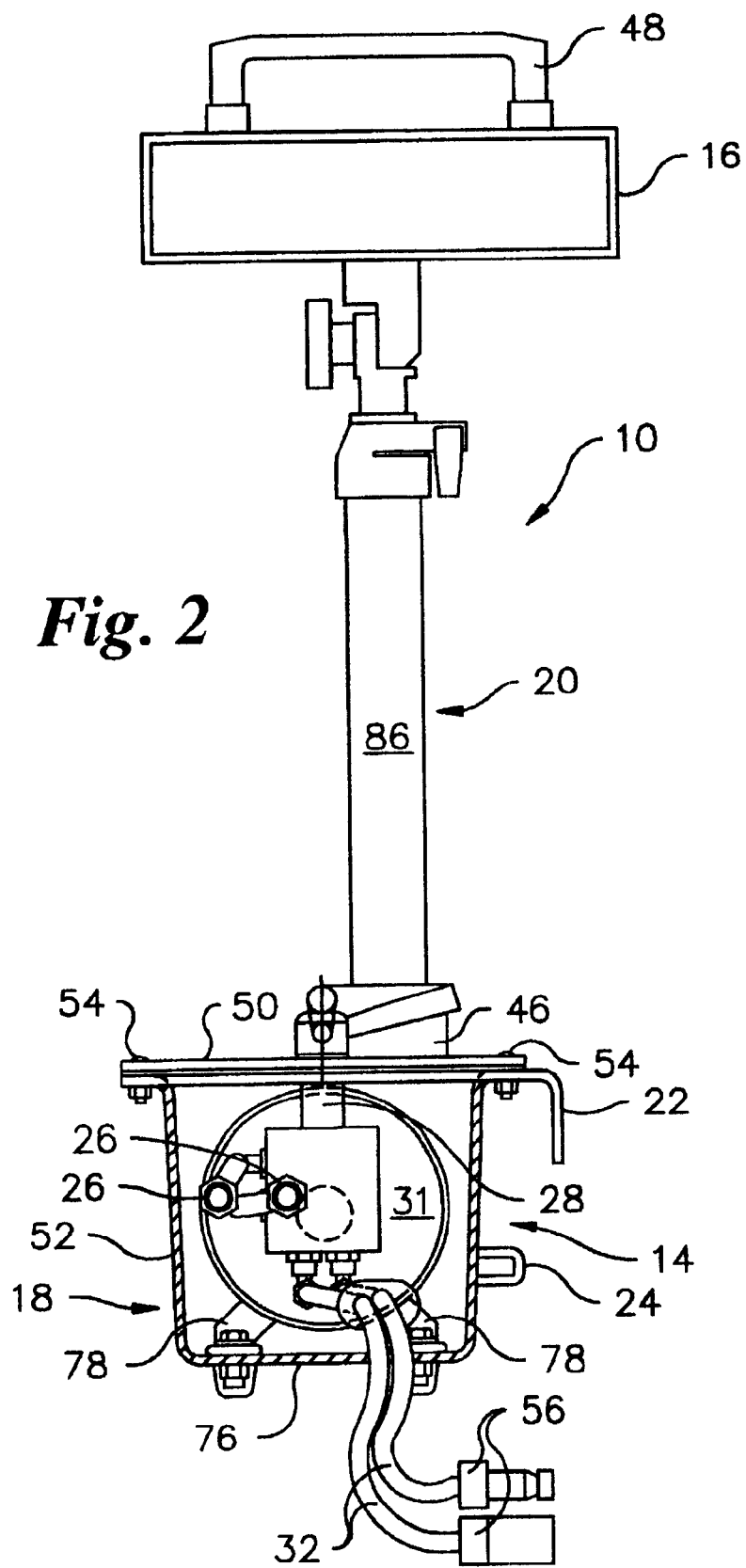
FIG. 2 is a front elevational view, partially in cross-section, of the light assembly of FIG. 1.
Figure 3:
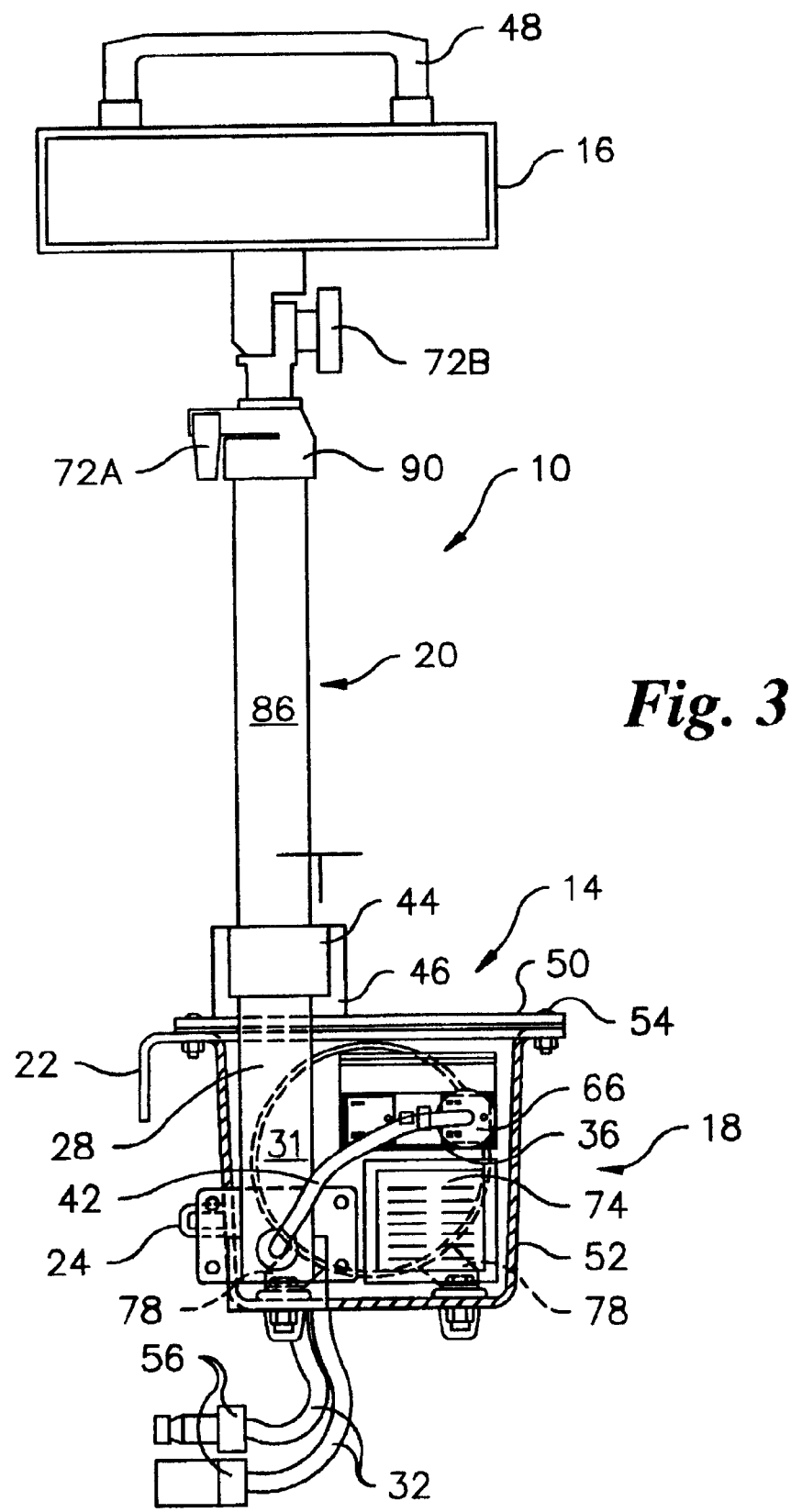
FIG. 3 is a rear elevational view, partially in cross-section, of the light assembly of FIG. 1.

As viewed in FIGS. 2–4, the front and rear sides of the housing 18 preferably have a width of between about eleven and about twelve inches. However, those of skill in the art will appreciate from this disclosure that the dimensions of the housing can be altered without departing from the scope of the present invention.

The base enclosure 52 and the cover 50 are preferably formed of a fiberglass material. However, those of skill in the art will appreciate from this disclosure that the present invention is not limited to a housing 18 formed of fiberglass material. For example, the housing 18 may be formed of a polyvinyl chloride material or any other material possessing the necessary strength, durability, and non-conductive properties required for use with electrically insulated environments.

Referring to FIGS. 1 and 2, the power supply 14 is positioned within the base enclosure 52 of the housing 18 and is attached to the inside bottom surface 76 of the base enclosure 52 using struts 78. Four struts are preferably used to support the generator 31 and the hydraulic turbine 30 along portions of the front and the back sides of the generator 31 as viewed in FIGS. 2 and 3.

The struts 78 are attached to the bottom surface 76 using fasteners 80. The fasteners 80 are preferably bolt and nut combinations, however any desired fasteners may be used. Referring to FIGS. 2 and 3, the struts 78 extend upwards and inwards inside of the base enclosure 52 to support the generator 31 (and the attached turbine 30). While it is preferred that the struts 78 be integrally formed with the generator 31 (which is shown in phantom lines in FIGS. 2–4), those of skill in the art will appreciate from this disclosure that the struts 78 can be separate components from the generator 31.

The power supply 14 generally receives pressurized fluid from the pressurized hydraulic fluid supply 98 and uses the fluid to turn the turbine 30. The turbine 30 is connected to the generator 31 and directly drives the rotor to produce electricity as is well known by those of skill in the art. The hydraulic turbine 30 preferably produces electrical power that is conditioned to 110 volts alternating current at about 60 hertz and 3 amps. However, those of skill in the art will appreciate from this disclosure that the particular characteristics of the electric energy produced by the generator 31 can be changed without departing from the scope of the present invention. For example, depending on the generator 31 that is selected, the electric energy can be direct current or the electric energy can be 220 volts alternating current, etc.

The power supply 14 preferably includes auxiliary pressure and return lines 26 adapted for connecting to a hydraulic tool (not shown). Referring to FIGS. 1, 2, and 4, the auxiliary pressure and return lines 26 preferably extend from the front side of the base enclosure 52 and are preferably positioned above the non-conductive hoses 32. However, it is understood by those of ordinary skill in the art that the present invention is not limited to auxiliary pressure and return lines 26 being located in any particular position in the light assembly 10.

Referring to FIG. 1, the auxiliary pressure and return lines 26 are connected to a manifold 58 which is positioned inside of the base enclosure 52 in front of the hydraulic turbine 30. The manifold 58 receives pressurized fluid from the pressurized hydraulic fluid supply 98 via the supply line of the non-conductive hoses 32. The auxiliary pressure and return lines 26 are preferably, but not necessarily, constructed of similar material to that of the non-conductive hoses 32. While the preferred embodiment of the present invention includes auxiliary pressure and return lines 26 for connecting to a hydraulic tool, those of skill in the art will appreciate from this disclosure that the present invention is not limited to a light assembly 10 having auxiliary pressure and return lines 26. For example, the light assembly 10 of the present invention may have no auxiliary pressure and return lines 26 or, alternatively, can include multiple sets, such as three of four sets, of auxiliary pressure and return lines 26 for connection of multiple hydraulic tools.

The auxiliary pressure and return lines 26 are connected to a selector valve 28. The selector valve 28 is positioned over and attached to the manifold 58. The selector valve 28 extends from the top of the manifold 58 and projects through the cover 50 of the housing 18. At the top of the selector valve 28 is a light and combination light and tool selection switch 34 which is further detailed herein. The power supply 14 is adapted to operate either one of the lamp 16 and the combination of the lamp 16 and a hydraulic tool (not shown) that is connected to the auxiliary pressure and return lines 26. The selector valve 28 is controlled and operated by using the light and combination light and tool selection switch 34. The light and combination light and tool selection switch 34 is turned to directly operate the selector valve 28 to control the flow of the pressurized fluid. Accordingly, the worker 'W' can choose to operate only the lamp 16 or can choose to run the lamp 16 in addition to a hydraulic tool that is being used in the work area by manipulating the light and combination light and tool selection switch 34.

While the preferred method of controlling the fluid flow in the power supply 14 is to use a directly operated selection valve 28, those of skill in the art will appreciate from this disclosure that the present invention is not limited to any particular method of controlling the fluid flow in the light assembly 10. For example, various combinations of electrical switches and solenoids can be used to move various valves that control the fluid supply depending on the particular light assembly 10 used. Modifications to the power supply that would be needed to control the fluid flow for use with multiple hydraulic tools, as well as the lamp 16, would be well known to those of skill in the art when considered in combination with this disclosure.

Figure 5:
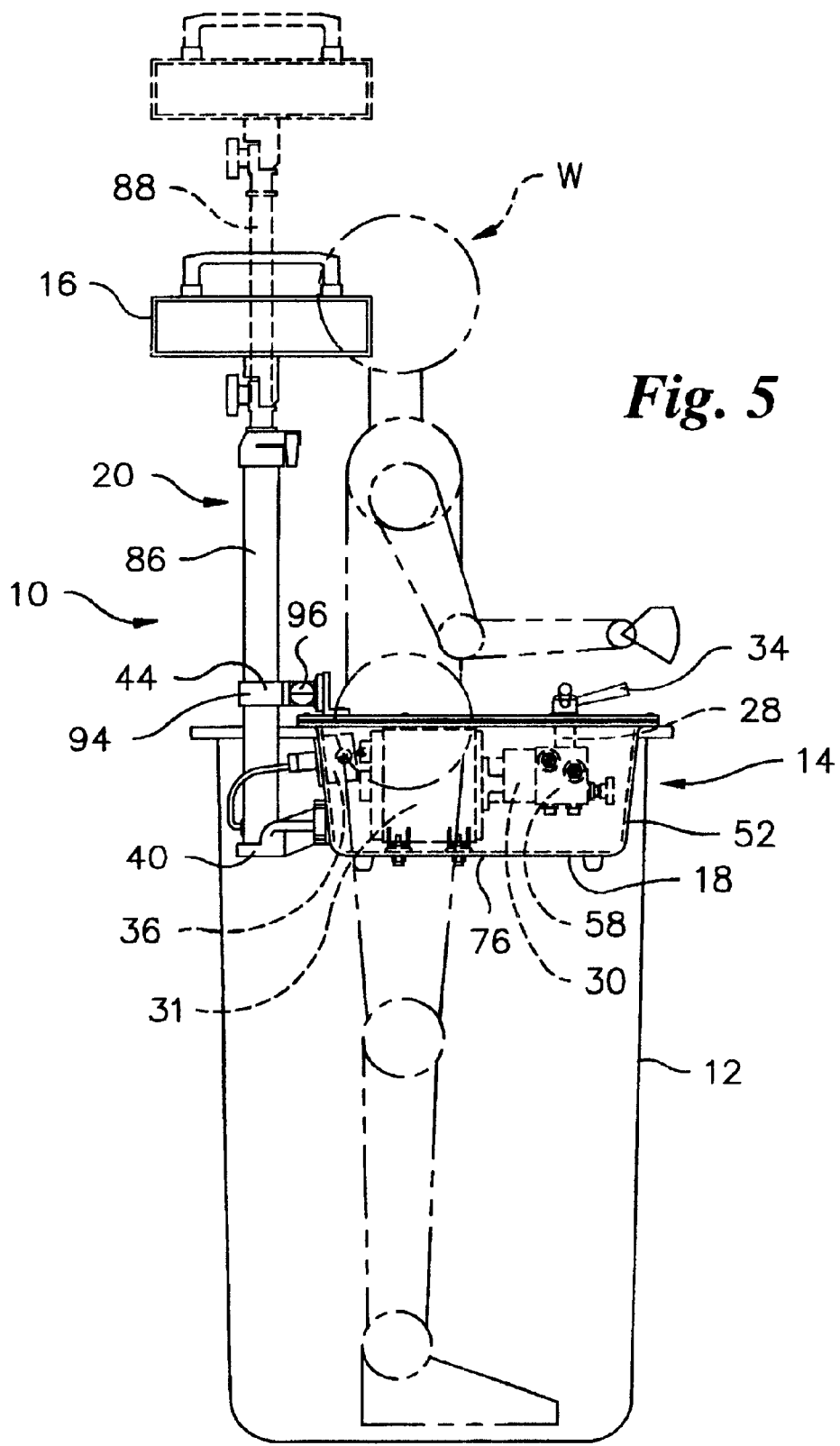
FIG. 5 is a side elevational view, partially in cross-section, of the light assembly of FIG. 1 attached to a bucket showing the adjustability of the position of the lamp.

Referring to FIGS. 1, 3, and 5, the power supply 14 includes an outlet 36 connected to the generator 31 output for attaching the lamp 16 to the power supply 14. Referring to FIGS. 1 and 5, the outlet 36 is connected to the generator 31 via a cable 64. The outlet 36 is preferably a ground fault interrupt outlet, however those of ordinary skill in the art will appreciate that the only important aspect of the outlet 36 is that the outlet 36 is capable of receiving the socket 66 of the lamp 16. A plug bearing face 68 of the socket 36 is generally aligned with the rear side 62 of the base enclosure 52. Along the outer surface of the rear side 62 of the base enclosure 52 is an outlet cover 38. An upper edge of the outlet cover 38 is hingedly attached to the base enclosure 52 and, accordingly, the outlet cover 38 can be pivoted between a first position, covering the outlet 36, and a second position, which exposes the outlet 36 to allow the socket 66 to engage the outlet 36.

The preferred method of connecting the lamp 16 to the hydraulic turbine 30 is to use a power cord 42 that runs through the inside of an adjustable pole 20, which is further detailed below, to connect the lamp 16 to the outlet 36. Alternatively, the connection between the lamp 16 and the hydraulic turbine 30 can be a direct power cable type of connection that forgoes the use of any interface, such as an outlet 36.

The lamp 16 is electrically connected to the power supply 14 and receives electrical energy therefrom. The lamp 16 is preferably a 300-watt halogen light, however, those of skill in the art will appreciate from this disclosure that any type of light may be used with the present invention depending only on the amount of power supplied from the pressurized hydraulic fluid supply 98. The preferred hydraulic turbine 30 generally requires about three to five gallons per minute of pressurized fluid to power a 300-watt halogen light. Most aerial lift trucks have a pressurized hydraulic fluid supply 98 that can provide three to five gallons per minute of pressurized fluid while the truck is idling and, accordingly, can power the lamp 16 of the light assembly 10. When running the lamp 16 and a set of tools, between seven and nine gallons per minute of pressurized fluid are required. This requires that the aerial lift truck have an engine speed (with which almost all aerial lift trucks are equipped) which would allow the pressurized hydraulic fluid supply to supply the needed pressurized fluid (sometimes referred to as an "engine two speed"). While fluid requirements and approximate electrical energy outputs have been detailed for the preferred hydraulic turbine 30, those of ordinary skill in the art will appreciate that various hydraulic turbines and generators can be used and that the selection of an appropriate hydraulic turbine and generator is within the gambit of one of ordinary skill in the art when considered in combination with this disclosure and the particular application.

Referring to FIGS. 1–5, the adjustable pole 20 is attached to the housing 18 and the lamp 16 is connected thereon. The adjustable pole 20 includes first and second poles 86, 88. The second pole 88 is shown in phantom lines in FIGS. 4 and 5. The second pole 88 is slidably mounted within the first pole 86 and is fixed in position relative to the first pole 86 by the first knob 72A that is attached to collar 90.

The adjustable pole 20 is attached to the rear side 62 of the base enclosure 52 using a bottom brace 40 and a bracket 46 which is mounted to the removable cover 50. A bottom end 70 of the first pole 86 is secured in the bottom brace 40. The bottom brace 40 supports the underside of the bottom end 70 of the first pole 86 and also encircles a portion of the bottom end 70 of the first pole 86. The bottom brace 40 includes a mounting plate 82 which is attached to the rear side 62 of the base enclosure 52. The mounting plate 82 is preferably fastened to the base enclosure 52 using fasteners 84. The bottom brace 40 extends outwardly from the mounting plate 82 to space the adjustable pole 20 a predetermined distance from the rear side 62 of the base enclosure 52. Referring to FIG. 3, the adjustable pole 20 is attached on the left half of the rear side 62 of the base enclosure 52.

The adjustable pole 20 is further secured by a clamp 44 which is attached to the housing 18 via the bracket 46. The clamp 44 extends around the first pole 86 with a band-like portion 94. The band-like portion 94 is tightened around the first pole 86 using fastener 96.

First and second knobs 72A, 72B allow the worker 'W' to adjust the position of the lamp 16. To adjust the height of or direction that the lamp 16 is pointing, the worker 'W' rotates the first knob 72A to allow the second pole 88 to slide within the first pole 86. Then, the worker 'W' positions the second pole 88 so that the lamp 16 is at the desired height and facing in the desired direction. Once the lamp 16 is properly oriented at the correct height and is facing in the desired direction, the first knob 72A is rotated and tightened. Then, the worker 'W' adjusts the second knob 72B to allow the lamp 16 to be angularly adjusted with respect to the horizon. Once the lamp 16 is appropriately adjusted, the worker 'W' tightens the second knob 72B. FIGS. 4 and 5, show in phantom lines how the lamp 16 can be positioned at different heights.

The bucket is preferably about 42 inches in height and when the light assembly 10 is properly mounted on the bucket 10, the lamp 16 is preferably positionable between about seventy and eighty-four inches from the base of the bucket. However, those of skill in the art will appreciate from this disclosure that the size of the bucket may vary and the height of the lamp 16 above the base of the bucket 12 can be changed accordingly without departing from the scope of the present invention. The modifications necessary to change the height to which the lamp can be adjusted would be known by one of skill in the art when considered in combination with the present disclosure.

While the preferred method of securing the adjustable pole 20 is to use the bottom brace 40 and the clamp 44, those of skill in the art will appreciate from this disclosure that the present invention is not limited to any particular method of securing the adjustable pole 20 to the housing 18. Additionally, while the preferred embodiment of the light assembly 10 uses an adjustable pole 20 to support the lamp 16, those of skill in the art will appreciate from this disclosure that the light assembly 10 does not require an adjustable pole 20 to support the lamp 16. The lamp 16 need not be supported by the adjustable pole 20 and can otherwise be mounted to another portion of the bucket 12, the worker 'W', or the housing 18. The only critical aspect of the connection between the lamp 16 and the generator 31 is that the lamp is capable of receiving electrical energy from the generator 31.

Furthermore, while the preferred embodiment uses only one lamp 16 with the light assembly 10, those of ordinary skill in the art will appreciate from this disclosure that any number of lamps 16 can be used with the light assembly depending only on a worker's preferences as long as there is enough electrical energy being supplied by the generator 31 to power the various lamps 16.

Referring to FIGS. 2–4, the light assembly 10 includes at least one hook 22 attached to the housing 18 and adapted to engage the bucket 12 of the aerial lift truck. The preferred embodiment of the light assembly 10 uses at least one hook 22 that is preferably integrally formed with the base enclosure 52. The hook 22 preferably extends the entire longitudinal length of the base enclosure 52. The hook 22 projects outward from the upper edge of one side of the base enclosure 52 in a direction substantially parallel to the bottom surface 76 of the base enclosure 52. After the hook 22 extends outward for a predetermined distance, the hook 22 bends downward and, in combination with one side of the base enclosure 52, forms an upside down U-shape as viewed in FIG. 2. Thus, the hook 22 allows the side of the bucket 12 to be slidably engaged by the light assembly 10. The shape of the hook 22 allows the light assembly 10 to be easily clipped to and removed from the bucket 12.

Referring to FIG. 4, the at least one hook 22 acts in combination with an abutment 24 to stably secure the light assembly 10 to the side of the bucket 12. The abutment 24 projects from the side of the base enclosure 52 from which the hook 22 protrudes and prevents the light assembly 10 from pivoting about the line of contact between the hook 22 and the bucket 12. The abutment 24 preferably runs the length of the side of the base enclosure 52.

While it is preferred that the light assembly 10 uses a hook 22 and an abutment 24 that run the length of the base enclosure 52, those of skill in the art will appreciate from this disclosure that multiple hooks 22 or abutments 24 can be used without departing from the scope of the present invention. Alternatively, single hooks 22 or abutments 24 can be used that do not run the entire length of the base enclosure 52. Additionally, while the preferred embodiment of the light assembly 10 uses only the combination of the hook 22 and the abutment 24 to secure the light assembly 10 to the bucket 12, those of skill in the art will appreciate from this disclosure that adjustable clamps, or similar pressure devices, can be used in conjunction with the hook 22 and the abutment 24 to further secure the light assembly 10 to the bucket 12. It should be understood that the particular method of attaching the light assembly to the bucket 12 is not pertinent to the present invention and various alternative methods can be used which when considered in combination with this disclosure are well known to those of skill in the art.

The power supply 14 is adapted to use an amount of fluid from the pressurized hydraulic fluid outlet necessary to power the lamp 16 and sends an excess of fluid to either one of the auxiliary pressure line 26 and the return line 32 to a fluid reservoir (not shown). Accordingly, depending on the position of the light and combination light and tool selection switch 34 (and thus the position of the selection valve 28), excess fluid is sent to either the auxiliary pressure line 26 to power a hydraulic tool or fluid is sent via the return line 32 directly back to the fluid reservoir. Additionally, when both the lamp 16 and hydraulic tool are being operated, any excess fluid is also returned to the fluid reservoir. Thus, depending on the particular activities of the worker 'W', the worker 'W' can alternately power a hydraulic tool and the lamp 16, or just the lamp 16.

Referring to FIG. 3, air vents 74 are used to vent heat from the housing 18 to the surrounding area. While not detailed herein, multiple known methods can be used to cool the power supply 14, such as additional vents or fans located within the sides of the housing 18. Alternative methods of cooling the power supply will be well known to those of ordinary skill in art when considered in combination with this disclosure. The method of cooling the power supply 14 is not pertinent to the present invention and, accordingly, is not further detailed herein.

The light assembly 10 of the present invention allows workers to use powered lights while in the bucket 12 of an aerial lift truck without interfering with the electrical isolation of the bucket while providing the required light to operate in a low light elevated environment with a reduced amount of shadow and blind spot generation. The light assembly 10 is easily adjustable by the worker 'W' without having to adjust the position of the bucket 12. Furthermore, the light assembly 10 provides light without the need for recharging batteries and without the limited operational time that is associated with batteries. The improved operation and easy adjustment of the light assembly 10 of the present invention increases the safety with which the worker 'W' can operate in an elevated low-light environment.

While the inventive light assembly 10 has been discussed in connection with electrically insulated buckets, it is understood by those of ordinary skill in the art that present invention is not limited to use with aerial lift trucks nor is the present invention limited to use with buckets 12. It is recognized by those skilled in the art, that changes may be made to the above-described embodiment of the present invention without departing from the broad inventive concept thereof. It is understood, therefore, that this invention is not limited to the particular embodiment disclosed, but is intended to cover all modifications which are within the spirit and scope of the invention as defined by the appended claims.

I claim:

1. A light assembly adapted for use with an electrically insulated bucket disposed on a boom of an aerial lift truck having a pressurized hydraulic fluid supply positioned proximate to the bucket, the light assembly comprising:

a power supply which converts energy from a fluid flow from the pressurized hydraulic fluid supply to electrical energy; and a lamp electrically connected to the power supply and receiving electrical energy therefrom.

2. The light assembly of claim 1, further comprising a housing substantially enclosing the power supply.

3. The light assembly of claim 2, further comprising an adjustable pole attached to the housing, the lamp being connected thereon.

4. The light assembly of claim 2, further comprising at least one hook attached to the housing that engages the bucket of the aerial lift truck.

5. The light assembly of claim 1, wherein the power supply has auxiliary pressure and return lines adapted for connection to a hydraulic tool.

6. The light assembly of claim 5, wherein the auxiliary pressure and return lines are connected to a selector valve and the power supply operates either one of the lamp or the combination of the lamp and the hydraulic tool that is connected to the auxiliary pressure and return lines.

7. The light assembly of claim 1, wherein the power supply includes:

a hydraulic turbine connected to a plurality of non-conductive hoses;

a generator connected to the hydraulic turbine; and a light and combination light and tool selection switch.

8. The light assembly of claim 7, wherein the power supply includes auxiliary pressure and return lines adapted for connection to the hydraulic tool.

9. The light assembly of claim 7, wherein the generator includes an outlet for attaching the lamp to the power supply.

10. The light assembly of claim 9, wherein the power supply only uses an amount of fluid from the pressurized hydraulic fluid outlet necessary to power the lamp and sends an excess supply of fluid to either one of the auxiliary pressure line and a fluid return line.

* * * * *